(12) United States Patent
Krishnamoorthi et al.

(10) Patent No.: US 8,325,856 B2
(45) Date of Patent: Dec. 4, 2012

(54) COHERENT INITIAL ACQUISITION

(75) Inventors: Raghuraman Krishnamoorthi, San Diego, CA (US); Tao Tian, San Diego, CA (US); Fuyun Ling, San Diego, CA (US); Yuheng Huang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 706 days.

(21) Appl. No.: 11/860,505

(22) Filed: Sep. 24, 2007

(65) Prior Publication Data
US 2008/0220723 A1 Sep. 11, 2008

Related U.S. Application Data

(60) Provisional application No. 60/893,105, filed on Mar. 5, 2007.

(51) Int. Cl.
*H04L 27/06* (2006.01)

(52) U.S. Cl. ........ 375/343; 375/135; 375/136; 375/146; 375/147; 375/149; 375/150; 375/236; 375/340; 375/344; 375/371; 375/375

(58) Field of Classification Search .................. 375/343, 375/135, 136, 146, 147, 149, 150, 236, 340, 375/344, 371, 375; 455/59; 370/320, 335, 370/342, 441, 479, 515; 708/300, 422, 813, 708/819
See application file for complete search history.

(56) References Cited

U.S. PATENT DOCUMENTS

| 5,852,630 | A  | * | 12/1998 | Langberg et al. | 375/219 |
| 6,687,285 | B1 | * | 2/2004  | Jou | 375/133 |
| 7,792,233 | B2 | * | 9/2010  | Yang et al. | 375/365 |
| 2006/0215538 | A1 | | 9/2006 | Murthy et al. | |
| 2008/0170645 | A1 | * | 7/2008 | Kleider et al. | 375/343 |

FOREIGN PATENT DOCUMENTS

| CN | 1539210 A | 10/2004 |
| EP | 0725496 | 8/1996 |
| JP | 8213933 A | 8/1996 |
| JP | 2002077287 A | 3/2002 |
| TW | I239153 | 9/2005 |
| TW | I244331 B | 11/2005 |
| WO | WO03003606 | 1/2003 |
| WO | WO2006099532 A2 | 9/2006 |

OTHER PUBLICATIONS

International Preliminary Report on Patentability, PCT/US2008/055832, International Bureau of WIPO, Sep. 17, 2009.
International Search Report and Written Opinion—PCT/US2008/055832, International Search Authority—European Patent Office—Jul. 23, 2008.
Taiwan Search Report—TW097107710—TIPO—Dec. 6, 2011.

* cited by examiner

*Primary Examiner* — Dhaval Patel
(74) *Attorney, Agent, or Firm* — Ryan Farr

(57) ABSTRACT

An acquisition module includes a coherent correlator configured to receive a transmission having a pilot signal and correlate the received transmission with a local copy of the pilot signal to produce a first output, a delayed correlator configured to delay the first output and correlate the first output with the delayed first output to produce a second output, and a detector configured to detect the pilot signal in the transmission based on the second output.

32 Claims, 6 Drawing Sheets

US 8,325,856 B2

COHERENT INITIAL ACQUISITION

CROSS-REFERENCE TO RELATED APPLICATIONS

The present application for patent claims priority to U.S. Provisional Application No. 60/893,105 entitled "COHERENT INITIAL ACQUISITION" filed Mar. 5, 2007, and assigned to the assignee hereof and hereby expressly incorporated by reference herein.

BACKGROUND

1. Field

The present disclosure relates generally to telecommunications, and more particularly to coherent initial acquisition of a pilot signal.

2. Background

Orthogonal Frequency Division Multiplexing (OFDM) is a multi-carrier modulation technique, which effectively partitions the overall system bandwidth into a large number of sub-carriers. These sub-carriers are spaced apart at precise frequencies to provide orthogonality. Content may be modulated onto the sub-carriers by adjusting each sub-carrier's phase, amplitude or both. Any suitable conventional modulation scheme may be used, such as phase shift keying (QPSK) or quadrature amplitude modulation (QAM) just to name is used, but other modulation schemes may also be used.

In OFDM systems, content is generally broadcast in super frames. A super frame generally consists of a number of symbols that are OFDM modulated with (N+K) sub-carriers, wherein the content is modulated onto N sub-carriers and a cyclic prefix is modulated onto K sub-carriers. The first OFDM symbol in the super frame is a pilot signal. This pilot signal is generated with a pseudo-random (PN) number that is repeated multiple times across the OFDM symbol. The time domain periodic structure of the pilot may be exploited to detect the start of the OFDM super frame and correct the initial frequency offset between the transmitter frequency and the local receiver frequency.

Heretofore, an incoherent acquisition process was used to process the pilot signal to detect the start of the super-frame and correct the initial frequency offset. Incoherent acquisition is a process whereby a delayed version of the received signal is correlated with the received signal itself. The correlator output has a high value during the pilot signal due to its periodicity. This approach, however, lacks the ability to differentiate the signal from tone interference well. In addition, the estimation of the initial frequency offset may be significantly impacted by the presence of tone interference.

Accordingly, there is a need in the art for improvements in the processes currently used for frame synchronization and initial frequency offset estimation in OFDM systems that are also applicable to other telecommunication systems employing a periodic pilot signal.

SUMMARY

In one aspect of the disclosure, an acquisition module includes a coherent correlator configured to receive a transmission having a pilot signal and correlate the received transmission with a local copy of the pilot signal to produce a first output, a delayed correlator configured to delay the first output and correlate the first output with the delayed first output to produce a second output, and a detector configured to detect the pilot signal in the transmission based on the second output.

In another aspect of the disclosure, an acquisition module includes means for receiving a transmission having a pilot signal, means for correlating the received transmission with a local copy of the pilot signal to produce a first output, means for delaying the first output, means for correlating the first output with the delayed first output to produce a second output, and means for detecting the pilot signal in the transmission based on the second output.

In a further aspect of the disclosure a method of telecommunications includes receiving a transmission having a pilot signal, correlating the received transmission with a local copy of the pilot signal to produce a first output, delaying the first output, correlating the first output with the delayed first output to produce a second output, and detecting the pilot signal in the transmission based on the second output.

In yet a further aspect of the disclosure, a machine-readable medium includes instructions executable by a processing system in a mobile service provider, the instructions comprising code for receiving a transmission having a pilot signal, correlating the received transmission with a local copy of the pilot signal to produce a first output, delaying the first output, correlating the first output with the delayed first output to produce a second output, and detecting the pilot signal in the transmission based on the second output.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The concepts described throughout this disclosure may be used in various wireless telecommunication systems including cellular systems, broadcast systems, wireless local area networks (WLAN), and others. Many concepts will be described in the context of a telecommunications system utilizing OFDM technology, but are equally applicable to other technologies including Code Division Multiple Access (CDMA), Time Division Multiple Access (TDMA), Frequency Division Multiple Access (FDMA), and other suitable technologies used to support an air interface in a wireless telecommunications system. An example of a telecommunications system utilizing OFDM is Qualcomm's Forward Link Only (FLO), a high quality broadcast system that provides real-time content streaming and other data services to mobile subscribers. Other examples include Ultra Mobile Broadband (UMB) and IEEE 802.11. UMB is an air interface standard promulgated by the 3rd Generation Partnership Project 2 (3GPP2) as part of the CDMA2000 family of standards, and IEEE 802.11 denotes a set of Wireless Local Access Network (WLAN) standards developed by the IEEE 802.11 committee for short-range communications. These examples are being provided for illustrative purposes and are not intended to limit the applicability of these concepts described herein in any way.

Figure 1:
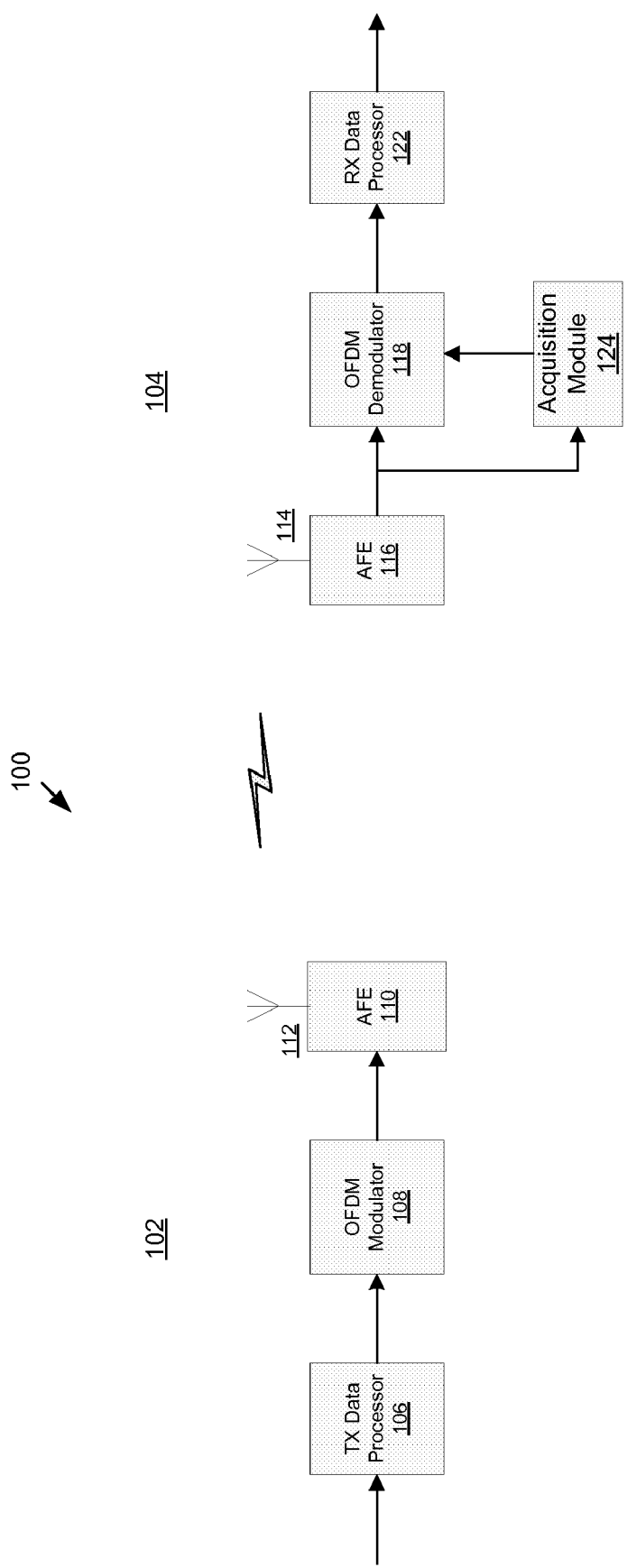
FIG. 1 is a high-level block diagram of a transmitter and receiver in a wireless telecommunications system.

FIG. 1 is a high-level block diagram of a transmitter 102 and receiver 104 in a wireless telecommunications system 100. The transmitter 102 may be part of a base station, and the receiver 104 may be part of a mobile subscriber station. Conversely, the transmitter 102 may be part of a mobile subscriber station and the receiver 104 may be part of a base station. The base station may be a fixed-site transceiver in a cellular network, an access point in a mesh or ad-hoc network, a transmitter station in a broadcast network, etc. The mobile subscriber station may be a mobile telephone, a personal digital assistant (PDA), a laptop computer, a wireless modem, a pager, a camera, a game console, a digital audio player, or any other suitable video, audio, or data device.

Turning to the transmitter 102, a transmit (TX) data and pilot processor 106 processes (e.g., encodes, interleaves, and symbol maps) traffic data and generates data symbols. The TX data and pilot processor 106 also generates pilot symbols. As used herein, a data symbol is a modulation symbol for data, a pilot symbol is a modulation symbol for pilot, and a modulation symbol is a complex value for a point in a signal constellation (e.g., for PSK or QAM). The data and pilot symbols output from the TX data and pilot processor 106 are grouped together into blocks of N time-domain symbols by an OFDM modulator 108. The OFDM modulator 108 then converts each block into an OFDM symbol, with the time-domain symbols being modulated onto N sub-carriers and a cyclic prefix modulated onto K sub-carriers. An analog front end (AFE) 110 processes (e.g., converts to analog, amplifies, filters, and frequency upconverts) the OFDM symbols and generates a modulated signal, which is transmitted via an antenna 112.

Turning to the receiver 104, an antenna 114 is used to receive the modulated signal from the transmitter 102 and provide it to an AFE 116. The AFE 116 processes the modulated signal (e.g., filters, amplifies, and frequency downconverts) to obtain a baseband signal and further digitizes the signal to obtain digital samples of the baseband signal. The digital samples are provided to an OFDM demodulator 118 to recover the time-domain data symbols from the sub-carriers of the OFDM symbols in each super frame. The recovered data symbols are provided to a receive (RX) data processor 122, which processes (e.g., symbol demaps, deinterleaves, and decodes) the data symbols to recover the transmitted data.

An acquisition module 124 is responsible for detecting the start of each super frame and correcting the initial frequency offset. In the configuration described thus far, a block of pilot symbols modulated onto the N sub-carriers of the first OFDM symbol in each super frame is used for this purpose. This block of pilot symbols is often referred to as a Time Division Multiplexed Pilot Symbol 1 (TDM Pilot 1) because it is the first of two time-division multiplexed pilots in the super frame. For clarity of presentation, and universal application, the first OFDM symbol in the super frame will be referred to hereafter as the "pilot signal." As discussed in the background portion of this disclosure, the pilot signal is generated with a pseudo-random (PN) number that is repeated multiple times across the OFDM symbol. It is provided by the AFE 116 to the acquisition modulation 124 for processing in the frequency domain. Alternatively, the pilot signal may be passed through the OFDM demodulator 118 before being provided to the acquisition module 124 for processing in the time domain.

Figure 2:
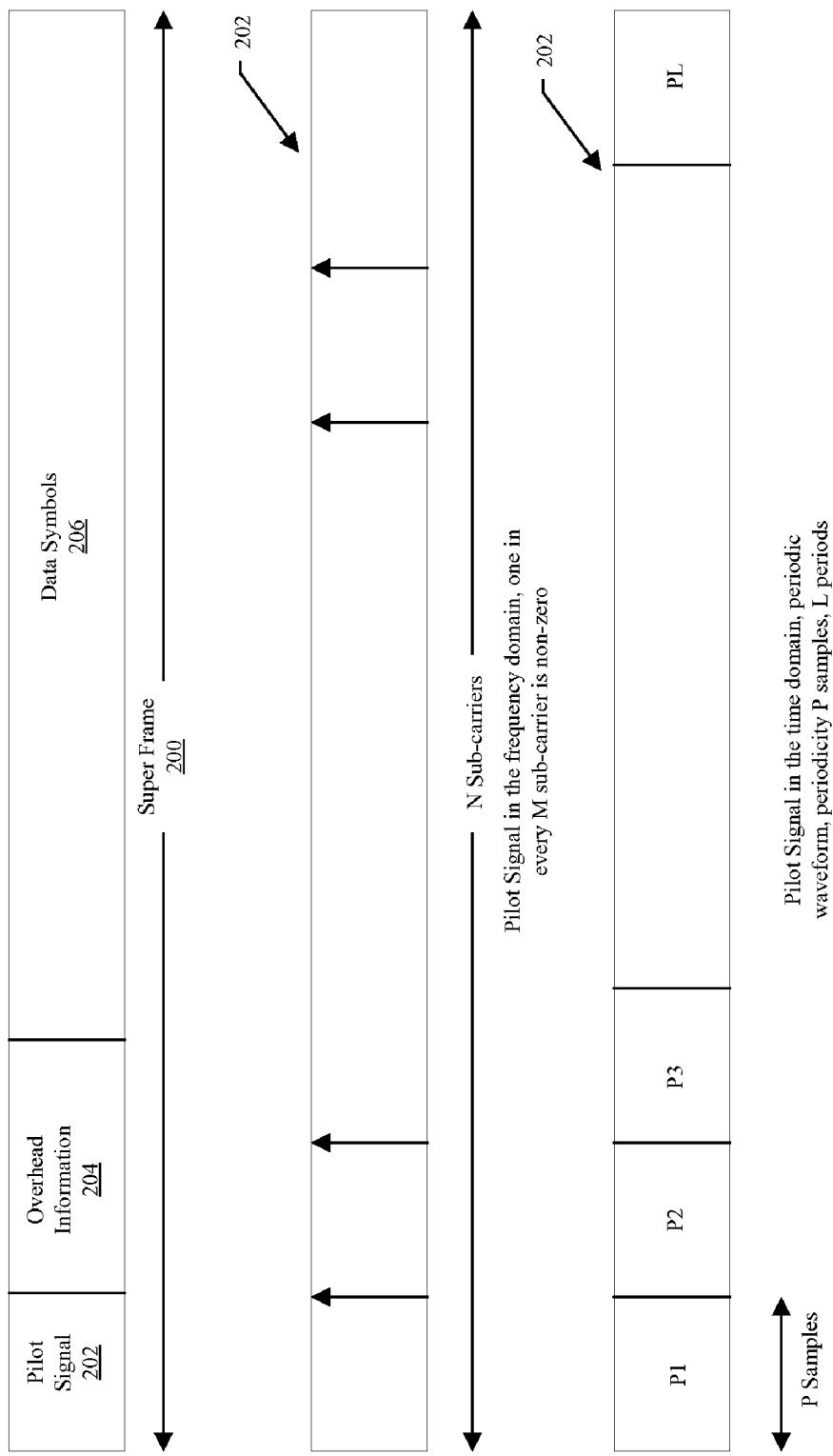
FIG. 2 is a diagram illustrating an example of a data structure for a super frame.

FIG. 2 is a diagram illustrating an example of a data structure for a super frame. In the time domain, the super frame 200 includes a pilot signal 202, overhead information 204, and data symbols 206. The pilot signal 202 is carried in the first OFDM symbol of the super frame and contains P samples repeated L times. The pilot signal 202 is shown as having N sub-carriers in the frequency domain of which only one in M is a non-zero value. In one example of a wireless telecommunications system, P=128, L=36, N=4096, and M=32.

Figure 3:
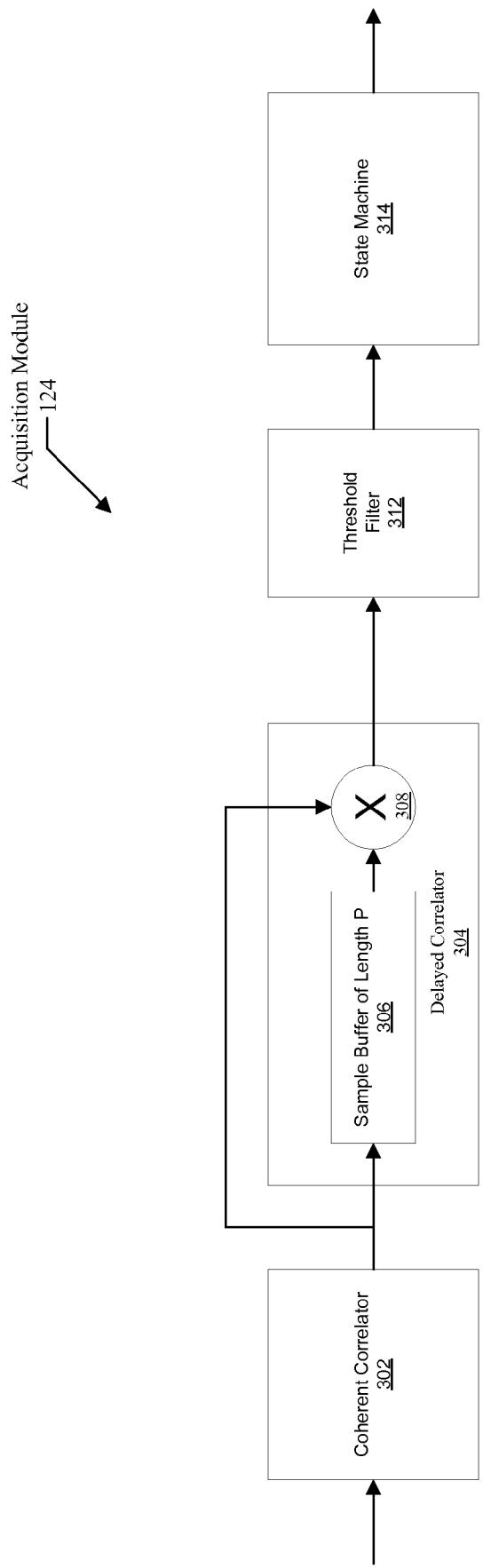
FIG. 3 is a conceptual diagram illustrating an example of an acquisition module in a receiver.

FIG. 3 is a conceptual diagram illustrating an example of an acquisition module. In this example, a coherent acquisition process may be used in either the frequency or time domain depending upon the particular configuration of the receiver. In the coherent acquisition process, the pilot signal is known, a priori, by the receiver 104 (see FIG. 1), and therefore, the timing of the received pilot signal can be determined through a correlation process with a locally generated replica of the pilot signal. This may be achieved with a coherent correlator 302 that takes a sliding window in time of 128 received samples and compares it with the locally generated replica. The coherent correlator 302 will exhibit multiple high energy peaks when the pilot signal is present.

A delayed correlator 304 is used to process the output from the coherent correlator 302. The delayed correlator 304 includes a sample buffer 306 that stores the last P samples output from the coherent correlator 302 and a multiplier 308. The sample buffer 306 and multiplier 308 function together to correlate a N sample output from the coherent correlator 302 with a delayed version of the same.

Figure 4:
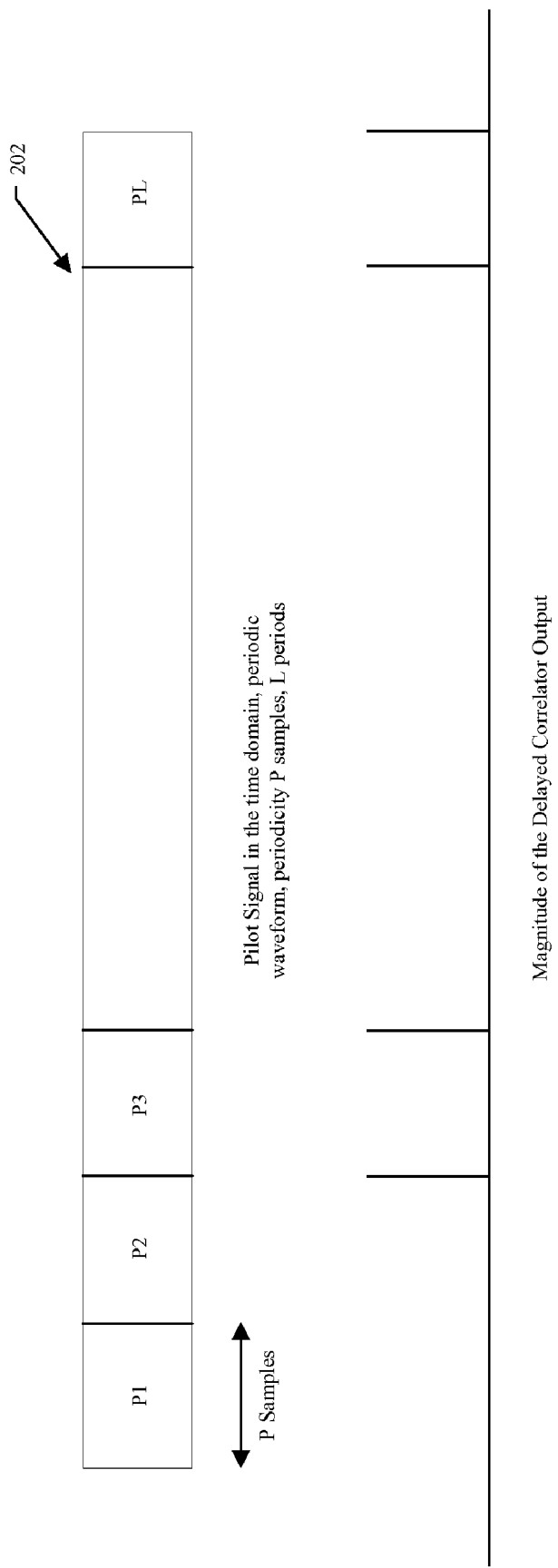
FIG. 4 is a timing diagram illustrating the magnitude of the delayed correlator output in a single path channel that has no noise or tone interference when the pilot signal is present.

FIG. 4 is a timing diagram illustrating the magnitude of the delayed correlator output in a single path channel that has no noise or tone interference when the pilot signal is present. In this example, there are L-2 high energy peaks output from the delayed correlator, because 2 N sample periods are needed for the process of coherent and delayed correlation. However, in practice, the delayed correlator output is not as clean due to noise, tone interference, imperfect coherent correlation with frequency offset, quantization artifacts, and other miscellaneous factors.

Returning to FIG. 3, a threshold filter 312 may be used to filter out noisy output samples from the delayed correlator 304 by forcing all non-zero samples that fall below a certain threshold to zero. A state machine 314 may be used to further process the output from the delayed correlator 302 for pilot signal detection.

Figure 5:
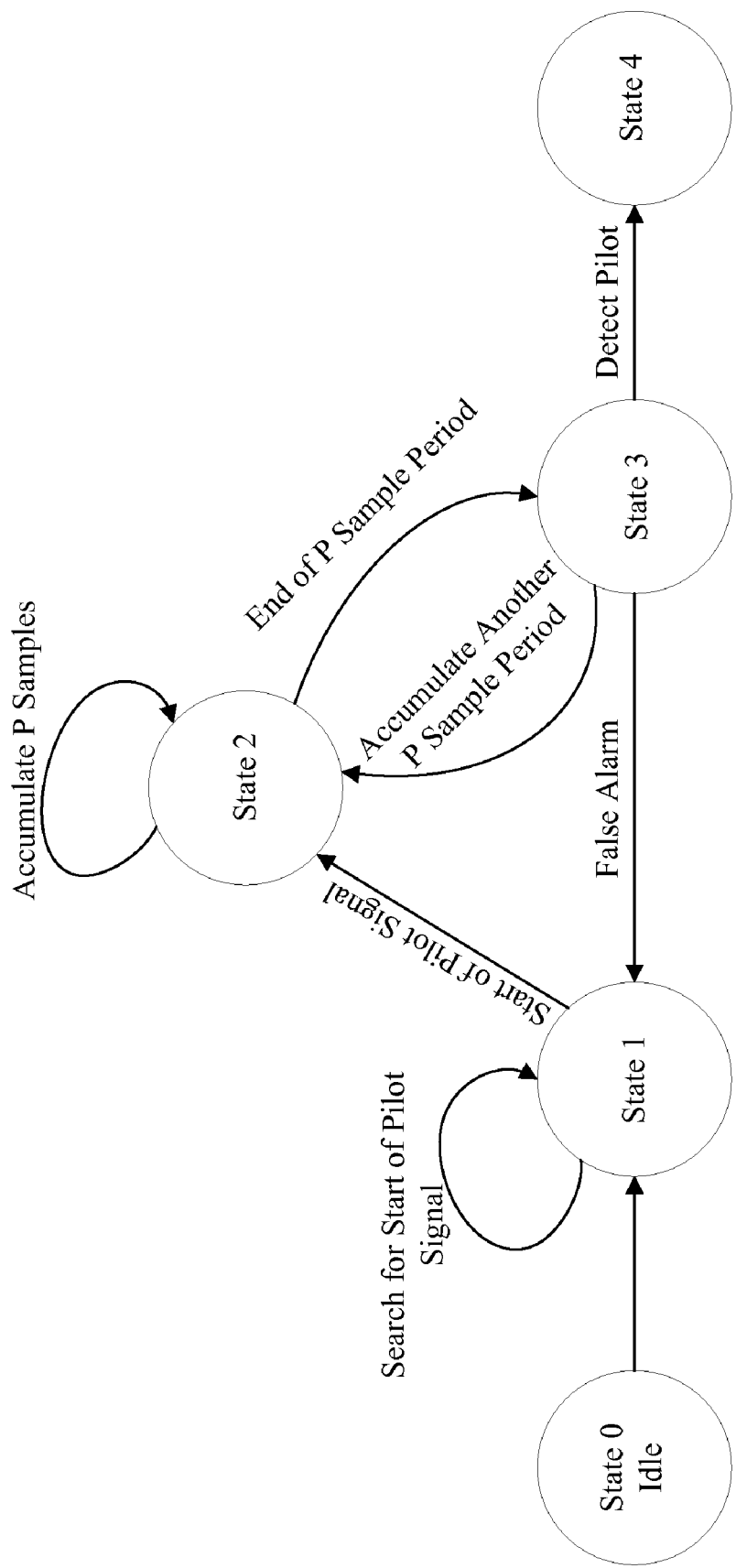
FIG. 5 is a state diagram illustrating the functionality of a state machine in an acquisition module.

FIG. 5 is a state diagram illustrating the functionality of the state machine. In this example, the state machine includes five states. Referring to FIGS. 1, 3 and 5, the state machine 314 is State 0 when the receiver 104 is idle. The state machine 314 transitions to State 1 when the receiver 104 requests service from the transmitter 102.

In State 1, the state machine 314 awakes from the idle state and monitors the output from the threshold filter 312 for a high energy peak (i.e., a non-zero sample). When the state machine 314 detects a high energy peak, it transitions to State 2.

In State 2, the state machine 314 accumulates N samples from the threshold filter 312. At the end of the N sample period, the state machine 314 transitions to State 3.

In State 3, the state machine 314 compares the magnitude of the accumulated samples to a threshold. The state machine 314 declares a "hit" if the threshold is exceeded, otherwise the state machine 314 declares a "miss." In response to a hit, the state machine 314 transitions back to State 2 to begin accumulating the next N samples output from the threshold filter 312. When the state machine 314 declares a miss, further processing is required to determine the next state.

The next state will depend on the number of previous hits and misses declared by the state machine 314 since transitioning from State 1 to State 2. If the number of previous hits exceeds a hit-threshold, then the acquisition module 124 has likely succeeded in detecting the pilot signal and will transition to State 4. The hit-threshold should generally be set to a number close to L-2. By way of example, in an ideal environment, a pilot signal comprising 128 samples repeated 36 times should produce 34 hits. However, the state machine 314 may be configured to detect the presence of a pilot signal if it receives 32 hits because 2 high energy peaks could be missing due to noise and tone interference.

If, on the other hand, the number of previous hits does not exceed the hit-threshold, then the state machine 314 determines whether the number of previous misses exceeds a miss-threshold. If the number of previous misses exceeds the miss-threshold, then the transition from State 1 to State 2 was likely caused by noise and tone interference, and therefore, the state machine 314 transitions back to State 1 to continue its search for a pilot signal. Conversely, if the number of misses is below the miss-threshold, then the current miss could be the result of noise and tone interference accompanying the pilot signal, and therefore, the state machine 314 transitions back to State 2 to begin accumulating the next N samples from the threshold filter 312. By way of example, the state machine 314 may be configured to allow up to 3 misses while processing a pilot signal before declaring a false alarm.

In State 4, the state machine 314 declares that a pilot signal is present. Once this occurs, the acquisition module 124 sends timing information to the OFDM demodulator 118 for frame synchronization. The phase values of the accumulated samples for the hit are used by an AFC 316 to compute and correct the initial frequency offset between the transmitter 102 clock and the local receiver 104 clock.

The acquisition module 124 may be implemented using software, hardware, or a combination of both. By way of example, the acquisition module 124 may be implemented with a processing system. The processing system may be a system dedicated to implementing the acquisition module 124. Alternatively, the processing system may implement multiple functions of the receiver described earlier in connection with FIG. 1. By way of example, in addition to the acquisition module 124, the processing system may be used to implement the OFDM demodulator 118, the RX data processor 122, and/or any parts thereof.

The processing system may include one or more processors. A processor may be a general purpose microprocessor, a microcontroller, a Digital Signal Processor (DSP), an Application Specific Integrated Circuit (ASIC), a Field Programmable Gate Array (FPGA), a Programmable Logic Device (PLD), logic circuits, discrete hardware components, or any other suitable entity that can perform calculations or other manipulations of information.

The processing system may also include one or more machine-readable media provide data storage and/or to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

Figure 6:
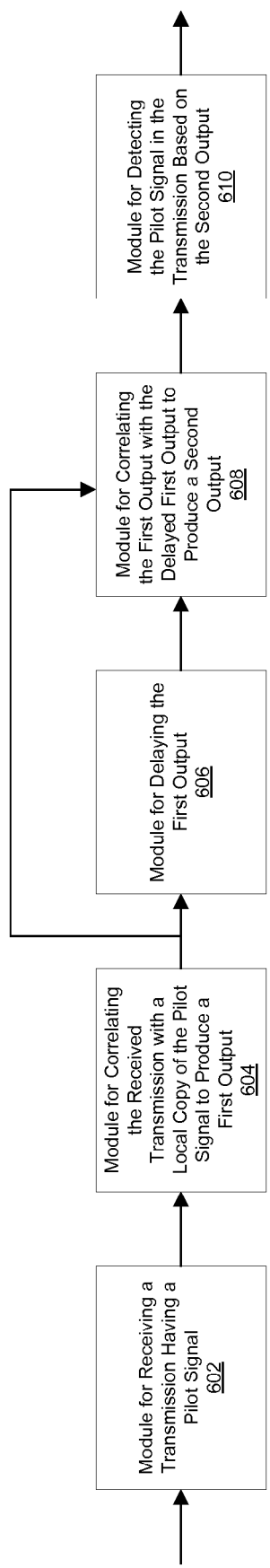
FIG. 6 is a functional block diagram of a processing system in a receiver.

FIG. 6 is a block diagram illustrating an example of various functions performed by the processing system to implement the acquisition module. In this example, the acquisition module includes a module 602 for receiving a transmission having a pilot signal, a module 604 for correlating the received transmission with a local copy of the pilot signal to produce a first output, a module 606 for delaying the first output, a module 608 for correlating the first output with the delayed first output to produce a second output, and a module 610 for detecting the pilot signal in the transmission based on the second output.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An acquisition module, comprising:
   a coherent correlator configured in hardware device to receive a transmission having a pilot signal and correlate the received transmission with a local copy of the pilot signal to produce a first output
   a delayed correlator configured to delay the first output and correlate the first output with the delayed first output to produce a second output; and
   a state machine configured to accumulate a first number of high energy peaks in the second output during a sampling period and detect the pilot signal by comparing a magnitude of the accumulated high energy peaks with a magnitude threshold and the first number with a hit threshold and a miss threshold,
   wherein the first number corresponds to a number of times the high energy peaks exceed the magnitude threshold, and
   wherein the state machine is further configured to:
      declare that the pilot signal was detected when the first number exceeds the hit threshold,
      continue accumulating high energy peaks if the first number is between the miss threshold and the hit threshold, and
      restart pilot signal acquisition when the first number is below the miss threshold.

2. The acquisition module of claim 1 further comprising a threshold filter configured to filter the second output and provide the filtered second output to the state machine for pilot signal detection.

3. The acquisition module of claim 1 wherein the state machine is further configured to generate timing information for the received transmission based on the second output.

4. The acquisition module of claim 1 wherein the transmission includes a super frame containing the pilot signal, and wherein the state machine is further configured to derive the timing of the super frame based on the second output.

5. The acquisition module of claim 1 wherein the state machine is further configured to derive a frequency offset for the transmission based on the second output.

6. The acquisition module of claim 1 wherein the pilot signal comprises a periodic sequence, and wherein the delayed correlator is further configured to produce a peak for each of the periods in the pilot signal, and wherein the state machine is further configured to detect the pilot signal when one or more of the peaks are missing due to noise or interference.

7. The acquisition module of claim 1 wherein the pilot signal comprises a periodic sequence, and wherein the delayed correlator is further configured to produce a peak for each of the periods in the pilot signal, and wherein the state machine is further configured to detect one or more peaks due to noise and interference and not declare a pilot signal in response thereto.

8. The acquisition module of claim 1 wherein the coherent correlator comprises a frequency domain correlator and the delayed correlator comprises a time domain correlator.

9. An acquisition module, comprising:
   means for receiving a transmission having a pilot signal;
   means for correlating the received transmission with a local copy of the pilot signal to produce a first output;
   means for delaying the first output;
   means for correlating the first output with the delayed first output to produce a second output; and
   means for accumulating a first number of high energy peaks in the second output during a sampling period;
   means for detecting the pilot signal by comparing a magnitude of the accumulated high energy peaks with a first magnitude threshold and the first number with a hit threshold and a miss threshold;
   means for declaring that the pilot signal was detected when the first number exceeds the hit threshold;
   means for continuing accumulating high energy peaks if the first number is between the miss threshold and the hit threshold; and
   means for restarting pilot signal acquisition when the first number is below the miss threshold wherein the first number of high energy peaks corresponds to a number of times the high energy peaks exceed the first magnitude threshold.

10. The acquisition module of claim 9 further comprising means for threshold filtering the second output and providing the filtered output to the means for detecting the pilot signal for pilot signal detection.

11. The acquisition module of claim 9 wherein the means for detecting the pilot signal comprises means for generating timing information for the received transmission based on the second output.

12. The acquisition module of claim 9 wherein the transmission includes a super frame containing the pilot signal, and wherein the means for detecting the pilot signal comprises means for deriving the timing of the super frame based on the second output.

13. The acquisition module of claim 9 wherein the means for detecting the pilot signal comprises means for deriving a frequency offset for the transmission based on the second output.

14. The acquisition module of claim 13 wherein the pilot signal comprises a periodic sequence, and wherein the means for correlating the first output with the delayed first output comprises means for producing a peak for each of the periods in the pilot signal, and wherein the means for detecting the pilot is further configured to detect the presence of the pilot signal when one or more of the peaks are missing due to noise or interference.

15. The acquisition module of claim 9 wherein the pilot signal comprises a periodic sequence, and wherein the means for correlating the first output with the delayed first output comprises means for producing a peak for each of the periods in the pilot signal, and wherein the means for detecting the pilot signal comprises means for detecting one or more peaks due to noise and interference and not declaring a pilot signal in response thereto.

16. The acquisition module of claim 9 wherein the means for correlating the received transmission with a local copy of the pilot signal comprises a frequency domain coherent correlator and the means for correlating the first output with the delayed first output comprises a time domain delayed correlator.

17. A method of telecommunications, comprising:
    receiving a transmission having a pilot signal;

correlating the received transmission with a local copy of the pilot signal to produce a first output;
delaying the first output;
correlating the first output with the delayed first output to produce a second output;
accumulating a first number of high energy peaks in the second output during a sampling period;
detecting the pilot signal by comparing a magnitude of the accumulated high energy peaks with a first magnitude threshold and the first number with a hit threshold and a miss threshold;
declaring that the pilot signal was detected when the first number exceeds the hit threshold;
continuing accumulating high energy peaks if the first number is between the miss threshold and the hit threshold; and
restarting pilot signal acquisition when the first number is below the miss threshold, wherein the first number corresponds to a number of times the high energy peaks exceed the first magnitude threshold.

18. The method of claim 17 further comprising threshold filtering the second output, and wherein the detection of the pilot signal is derived from the filtered second output.

19. The method of claim 17 wherein the detection of the pilot signal comprises generating timing information for the received transmission based on the second output.

20. The method of claim 17 wherein the transmission includes a super frame containing the pilot signal, and wherein the detection of the pilot signal comprises deriving the timing of the super frame based on the second output.

21. The method of claim 17 wherein the detection of the pilot signal comprises deriving a frequency offset for the transmission based on the second output.

22. The method of claim 17 wherein the pilot signal comprises a periodic sequence, and wherein the correlation of the first output with the delayed first output produces a peak for each of the periods in the pilot signal, and wherein the pilot signal is detected when one or more of the peaks are missing due to noise or interference.

23. The method of claim 17 wherein the pilot signal comprises a periodic sequence, and wherein the correlation of the first output with the delayed first output produces a peak for each of the periods in the pilot signal, the method further comprising not declaring a pilot signal in response to one or more peaks due to noise and interference.

24. A non-transitory machine-readable medium comprising instructions executable by a processing system in a mobile service provider, the instructions comprising code for:
receiving a transmission having a pilot signal;
correlating the received transmission with a local copy of the pilot signal to produce a first output;
delaying the first output;
correlating the first output with the delayed first output to produce a second output;
accumulating a first number of high energy peaks in the second output during a sampling period;
detecting the pilot signal by comparing a magnitude of the accumulated high energy peaks with a first magnitude threshold and the first number with a hit threshold and a miss threshold;
declaring that the pilot signal was detected when the first number exceeds the hit threshold;
continuing accumulating high energy peaks if the first number is between the miss threshold and the hit threshold; and
restarting pilot signal acquisition when the first number is below the miss threshold, wherein the first number corresponds to a number of times the high energy peaks exceed the first magnitude threshold.

25. The method of claim 17 wherein the correlation of the received transmission with a local copy of the pilot signal comprises a frequency domain coherent correlation and the correlation of the first output with the delayed first output comprises a time domain delayed correlation.

26. The non-transitory machine-readable medium of claim 24 further comprising code for threshold filtering the second output, and wherein the code for detecting the pilot signal comprises code for deriving detection from the filtered second output.

27. The non-transitory machine-readable medium of claim 24 wherein the code for the detecting the pilot signal comprises code for generating timing information for the received transmission based on the second output.

28. The non-transitory machine-readable medium of claim 24 wherein the code for receiving the transmission having a pilot signal includes code for receiving a transmission having a super frame containing the pilot signal, and wherein the code for detecting the pilot signal comprises code for deriving the timing of the super frame based on the second output.

29. The non-transitory machine-readable medium of claim 24 wherein the code for the detecting the pilot signal comprises code for deriving a frequency offset for the transmission based on the second output.

30. The non-transitory machine-readable medium of claim 24 wherein the pilot signal comprises a periodic sequence, and wherein the code for correlating the first output with the delayed first output comprises code for producing a peak for each of the periods in the pilot signal, and wherein the code for detecting the pilot signal comprises code for detecting when one or more of the peaks are missing due to noise or interference.

31. The non-transitory machine-readable medium of claim 24 wherein the pilot signal comprises a periodic sequence, and wherein the code for correlating the first output with the delayed first output comprises code for producing a peak for each of the periods in the pilot signal, and further comprising code for not declaring a pilot signal in response to one or more peaks due to noise and interference.

32. The non-transitory machine-readable medium of claim 24 wherein the code for correlating the received transmission with a local copy of the pilot signal comprises code for a frequency domain coherent correlation and the code for correlating the first output with the delayed first output comprises code for a time domain delayed correlation.

* * * * *